Patented May 26, 1953

2,640,035

UNITED STATES PATENT OFFICE 2,640,035

NONDISCOLORING RECLAIM AND PROCESS FOR PREPARATION

Gardner L. Brown, Theodore A. Johnson, and Robert B. Knill, Akron, Ohio, assignors to Wingfoot Corporation, Akron, Ohio, a corporation of Delaware No Drawing. Application January 6, 1951, Serial No. 204,832

9 Claims. (Cl. 260—2.3)

This invention relates to the reclaiming of scrap rubber and more particularly to a method for preparing a non-staining or non-discoloring reclaim and to the resulting product.

While rubber reclaimed by the customary methods is satisfactory for most purposes, there are some uses for which it is not suitable. For example, when a reclaim is used under a light-colored stock, a discoloration results. This discoloration creates a dulling effect or staining. For these and similar uses, ordinary commercial reclaimed rubbers are not satisfactory.

This phenomenon of discoloring has never been technically explained. However, it is believed that it is caused by the migration of compounding ingredients used in the production of vulcanized rubber articles. Such ingredients find their way to the surface where sunlight, oxygen, or ozone from the atmosphere causes them to change their chemical or physical structure and thus brings about discoloration. It is thought that nitrogen-containing anti-oxidants have a tendency to so migrate and when exposed at the surface, have a tendency to darken and that reclaiming oils tend to migrate to the surface and oxidize with resultant discoloration.

For many years there has been a constant search for a reclaiming method which would provide a reclaim that would not discolor. Such a reclaim would be useful in the construction of such products as white sidewall tires, light-colored mats, and many other items where discoloration currently prohibits the use of reclaim. The use of a nondiscoloring reclaim can substantially lower the price of such items.

It is a primary object of this invention to provide a reclaim which will not produce discoloration when used in the construction of white or light-colored articles of manufacture.

Another object of this invention is to produce a cheap, nondiscoloring rubber reclaim which can be substituted for expensive natural and synthetic rubber in articles where such practice was formerly impossible. Other objects and advantages will appear as the description proceeds.

In practicing this invention, scrap rubber is prepared for digestion according to the customary methods, for example, by removing any metal present and shredding the scrap. The scrap can then be digested in an internally heated or steam-jacketed digester using any of the customary processes such as an acid, alkali, neutral, or solution process. It is essential in practicing this invention that the reclaiming oil used in the devulcanization process be a nondiscoloring oil as hereinafter described. The devulcanized scrap is dried in the customary manner. Thereafter, the devulcanized rubber may be blended with a nondiscoloring reclaiming oil, mixed with an unvulcanized rubber, e. g., natural rubber or a rubbery butadiene-styrene copolymer, and an adsorbent material such as activated carbon which remains in the final product. The manner in which this is done is important and is set out in detail below.

Preferably, a nondiscoloring oil is loose-blended with the dried devulcanized scrap to lubricate the scrap for later processing. Varying amounts of such oil may be added ranging from 0 per cent to 10 percent, but in the interest of economy and later processability, it is preferable to use from about 2½ per cent to about 5 per cent, based on the weight of the scrap. This treatment may be omitted where subsequent treatment imparts the requisite plasticity. These "nondiscoloring" reclaiming oils constitute an established and well recognized class of materials.

The following lists the physical properties of certain nondiscoloring oils:

| Oils | Sp. G. | Flash Point, ° F. | Fire Point, ° F. | Initial Boiling Point, ° F. | Iodine Number |
|---|---|---|---|---|---|
| #1 | .920 | 155 | 165 | 175 | 50.2 |
| #2 | .907 | 185 | 200 | 175 | 66.0 |
| #3 | .845 | 145 | 155 | 310 | 92.7 |

No. 3 is Solvenol, a nondiscoloring reclaiming oil identified in U. S. Patent No. 2,558,764.

In practicing the invention, the rubber oil blend is masticated and plasticized in a conventional rubber strainer whereby substantially all extraneous material is removed and small hard particles are ground and masticated and mixed with the oil. This creates a finished product that is tackier, smoother, better blended, and which has fewer hard tailings after the final refining.

The strained rubber-oil blend is then compounded with unvulcanized rubber hydrocarbons, an adsorbent material, and more nondiscoloring softener. Preferably, an internal mixer, for example a Banbury mixer, is used for this step. If sufficient unvulcanized rubber is added, mill blending is feasible. The presence of unvulcanized rubber hydrocarbon is essential in practicing this invention in order to obtain processability and proper dispersion of the adsorbent material. If sufficient nondiscoloring softener is added during prior operations to insure processability, the addition of more softener at this point may not be necessary. The unvulcanized rubber hydrocarbon generally used in practicing this invention is natural rubber. However, the rubbery copolymers of butadiene and styrene have proven satisfactory. Obviously, the unvulcanized rubber used in practicing this invention should be free from ingredients which produce discoloration.

Based on the total batch weight, about 50 to 75 per cent of scrap-oil blend may be used. To this is added about 10 to 20 per cent of unvulcanized rubber, for example, natural rubber or GR–S. About 5 to 20 per cent of a finely divided adsorbent material is added, for example, finely divided activated charcoal, finely divided activated carbon, or finely divided adsorbent clay. About 1 to 5 per cent of nondiscoloring oil can be used.

Addition of a finely divided adsorbent material in the presence of new rubber-type hydrocarbon is essential in practicing the invention. As a result, a new product is obtained wherein the ingredients which produce discoloration are immobilized and prevented from migrating to the surface. This phenomenon is not readily understood and is wholly unexpected in view of consistent failures in the past to obtain a nondiscoloring reclaim, many such failures involving attempts to use adsorbents.

In a preferred embodiment of the invention there was used about 67.2 per cent of scrap devulcanized with a nondiscoloring reclaiming oil, about 14.3 per cent crude rubber, about 14.3 per cent of finely divided activated charcoal, and about 4.2 per cent of a nondiscoloring oil, for example, rosin oil. Finely divided activated charcoal known as "Nuchar" is the adsorbent material preferably used. The unvulcanized rubber was added to give processability during the internal mixing. The addition of an adsorbent material in a mixer whereby the discoloring oils and anti-oxidants remaining in the scrap are intimately mixed with the adsorbent material is critical. The reclaim blend is finally refined by passing through a conventional refiner, rolled, and slabbed preparatory to re-use.

In another embodiment, the improved method was applied to the reclaiming of tire scrap as follows:

Seventy-five hundred pounds of mixed natural and synthetic scrap tires were cooked for three and one-half hours at 300 pounds per square inch steam pressure. Based on the scrap rubber, twenty-six per cent by weight of nondiscoloring rosin reclaiming oil was added to the cook. The devulcanized stock was next washed and dried by passing through a dryer. This stock, in the form of pellets, was then mixed in a rotary blender with about 2½ per cent by weight of the same oil as before, a nondiscoloring reclaiming oil. The devulcanized rubber-oil blend was then passed through a conventional rubber strainer with a screen having about three hundred twenty-five apertures per square inch.

Based on the total batch weight, 67.2 per cent of this blend was mixed in an internal mixer with 14.3 per cent crude natural rubber, 14.3 per cent finely divided activated charcoal, and 4.2 per cent yellow dip rosin oil, a nondiscoloring reclaiming oil. This batch was mixed for six and one-half minutes and reached a discharge temperature of about 250° F. It was then refined, rolled, and slabbed. The finely divided charcoal particles were of such diameter as to pass through a 165 mesh screen.

Tests have shown that a superior nondiscoloring reclaim was thus produced. The reclaim had more tack, processed easier, had better shelf life, had fewer tailings, and had good nondiscoloring characteristics. Various tests involving artificial aging and atmospheric aging have conclusively shown that the reclaim produced according to the teaching of this invention is actually nondiscoloring.

The nondiscoloring character of a reclaiming oil or of a finished reclaim can be determined by the following test. A stock to be tested is milled and sheeted into a thin sheet. This sheet is then cured with a known white nondiscoloring sheet, for example, with a natural rubber blend, or it may be cured between two such sheets. The cure is usually for 50 minutes at 260° F., although this will vary with the stock used. These blocks may then be tested for discoloration by all of the usual testing procedures, for example, by exposure to sunlight, artificial oxygen aging, atmosphere aging, and ultraviolet radiations. As used in the present specification and claims, the term "nondiscoloring," as applied to both reclaiming oils and finished reclaim, means a material which does not produce discoloration when subjected to this test.

Standard samples can be prepared, wherein known quantities of discoloring ingredients are added. These samples can be given a numerical value and used as a comparison for later tested unknown samples. Known colorimetric tests give very reliable results.

In view of the many failures in attempting to produce a reclaim which would actually be nondiscoloring, the product made as above outlined was subjected to test.

The material was tested by artificial aging and atmospheric aging as set forth above. Finally the ultimate test of use was applied, test tires being constructed. The sidewalls of these tires remained substantially white after undergoing testing as outlined above.

While certain representative embodiments and details have been shown for the purpose of illustrating the invention, it will be apparent to those skilled in this art that various changes and modifications may be made therein without departing from the spirit and scope of the invention.

We claim:

1. The method of preparing a nondiscoloring reclaimed rubber composition which comprises the successive steps of devulcanizing scrap rubber with a nondiscoloring reclaiming oil, blending said scrap rubber with a nondiscoloring reclaiming oil, and compounding said scrap rubber with finely divided activated charcoal and unvulcanized rubber.

2. The method of preparing a nondiscoloring reclaimed rubber composition which comprises the successive steps of devulcanizing scrap rubber with a nondiscoloring reclaiming oil, blending said scrap rubber with a nondiscoloring reclaiming oil, and compounding said scrap rubber with finely divided activated carbon and unvulcanized rubber in an internal mixer.

3. The method defined by claim 2 wherein the unvulcanized rubber is natural rubber.

4. The method defined by claim 2 wherein the unvulcanized rubber is a rubbery copolymer of butadiene and styrene.

5. The method of preparing a nondiscoloring reclaim rubber composition which comprises the steps of devulcanizing scrap rubber with a nondiscoloring reclaiming oil, blending said scrap rubber with a nondiscoloring reclaiming oil, and intimately blending said scrap rubber in an internal mixer with about 10 to 20% by weight of unvulcanized rubber and about 5 to 20% by weight of activated carbon.

6. A nondiscoloring reclaimed rubber composition comprising a blend of devulcanized scrap rubber which has been devulcanized with a nondiscoloring reclaiming oil, unvulcanized rubber, and finely divided activated carbon which is intimately distributed throughout the composition.

7. The product of claim 6 wherein the unvulcanized rubber is natural rubber.

8. The product of claim 6 wherein the unvulcanized rubber is a rubbery copolymer of butadiene and styrene.

9. A nondiscoloring reclaimed rubber composition comprising a blend of devulcanized scrap rubber which has been devulcanized with a nondiscoloring reclaiming oil, about 10 to 20% by weight of unvulcanized rubber and about 5 to 20% by weight of activated carbon.

GARDNER L. BROWN.
THEODORE A. JOHNSON.
ROBERT B. KNILL.

References Cited in the file of this patent

UNITED STATES PATENTS

| Number | Name | Date |
|---|---|---|
| 2,098,429 | Morron | Nov. 9, 1937 |
| 2,386,707 | Moore | Oct. 9, 1945 |
| 2,558,764 | Lewis | July 3, 1951 |

OTHER REFERENCES

India-Rubber Journal, page 17, August 9, 1930.